March 9, 1937.　　　　G. SCIARRA　　　　2,073,567
AUTOMATIC MACHINE FOR THE MANUFACTURE OF ALIMENTARY PASTE
Filed Jan. 17, 1935

INVENTOR:
G. Sciarra
BY:
Glascock Downing & Seebold
ATTORNEYS.

Patented Mar. 9, 1937

2,073,567

UNITED STATES PATENT OFFICE 2,073,567

AUTOMATIC MACHINE FOR THE MANUFACTURE OF ALIMENTARY PASTE

Giustino Sciarra, Isernia, Italy

Application January 17, 1935, Serial No. 2,312
In Italy January 19, 1934

1 Claim. (Cl. 107—30)

This invention relates to preliminary mixers as an attachment to continuously working paste-preparing apparatus. More particularly the invention applies to mixers for paste presses, having independently regulable delivery means for meal or grit and water and a pair of rollers with scrapers bearing against their cylindrical surfaces, said rollers being adapted to effect a preliminary mixing of the basic substances of the mixture. Such preliminary mixers are known per se for combining the water and dry substance in a chamber arranged above the pair of rollers. It cannot however be avoided that the walls of the said chamber receive a deposit of incrustations which gradually become thicker and harder. In order to avoid such undesirable deposits and to keep the casing over the pair of rollers as clean as possible, there is arranged, according to the present invention, adjacent the casing wall of each roller, a moistening device which provides the roller with a film of water and above the upper peripheral surface of each roller between the moistening device and the roller gap a spraying device, which delivers the dry substance in the known manner as a uniform veil on the film of water. The meal or grit in such an apparatus comes in contact with the water only on the roller surfaces. According to the present invention, the preliminary mixer uses a water supplying system for creating a certain degree of moisture of a paste consisting of a mixture of grain and water treated between rollers. The said water supplying system is known per se but it has the above explained advantages when used in connection with the aforesaid preliminary mixers.

A constructional example of an apparatus according to the present invention is shown in the accompanying drawing.

Figure 1:
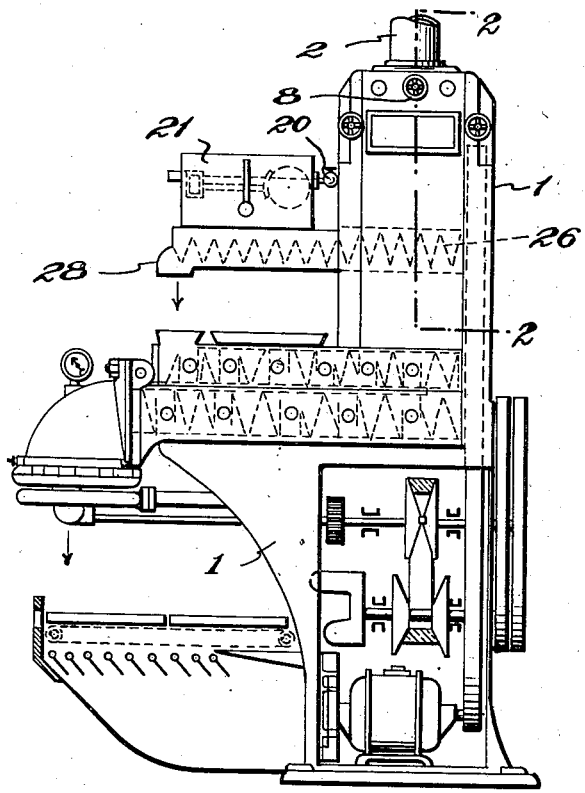
Figure 1 is a side elevation of a continuously working paste press with upper preliminary mixer according to the present invention.

At the top of the supporting frame 1 of the paste-preparing apparatus is to be found a glass tube 2 through which semola or meal descends subdivided into two parts by the dividing wall 3 and controlled by the horizontal closing slide valves 4 and 5 cooperating with two movable guides 6 and 7 actuated by two screw handwheels 8 and 9 so that a horizontal approaching movement to the divisional wall 3 or distancing movement therefrom may be accomplished.

Under the movable guides 6 and 7, the working surfaces 10 and 11 of which are inclined downwards and towards the divisional wall 3, there are situated two rollers 12 and 13 rotating respectively to the right and to the left as shown by the arrows.

The casing rollers 12 and 13 are grooved on their cylindrical surfaces and directed parallel to the axis of the rollers, these grooves (not illustrated) are filled with semola in a greater or lesser proportion according to the speed of rotation of the rollers 12 and 13 either in relation to the degree of aperture or to the reciprocal distance of the guides 6 and 7, so that, by rotating with a uniform movement, they drop desired quantities of semola or meal on rollers 14 and 15 rotating in the corresponding direction indicated by the arrows.

From the rollers 14 and 15 the semola or meal falls in the shape of a veil or film on the smooth-faced drums 16 and 17 rotating respectively to the left and the right as shown by the arrows, on which drums the spraying tubes 18 and 19 deposit a veil or film of water flowing through the pump 20 from the receptacle with a constant water-gauge 21.

With the object of accurately detaching the wet meal veil from drums 16 and 17 scrapers 31 and 32 are used, deviating the veil of water and semola or flour into a channel 27 engaged with the conveying and mixing screws 26 having the object to allow the necessary time for the mixture obtained so that the particles of semola might be chemically bound with the quantity of water coordinated to them.

The double veil of semola or meal and water deposited on drums 16 and 17, is partially crushed along the contact line 25 of said drums from where it descends to the double agitating and conveying screws 26 contained within channel 27 and pushing the mass to the fall spout 28.

Figure 2:
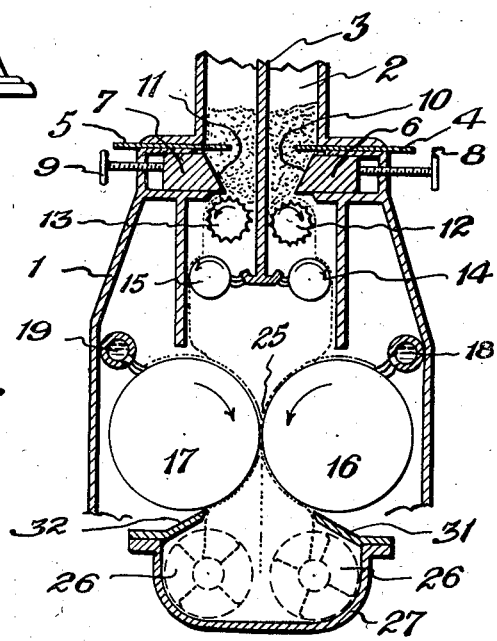
Fig. 2 is a vertical section along line 2—2, Fig. 1 through the preliminary mixer in the upper portion of the press comprising the present invention for effecting the preliminary mixing operation and supplying the individual ingredients of the mixture.

It is obvious, especially from Figure 2, that the grit or the meal passes, for example, through the filling tube 2 in delivery means into the separately adjustable spaces between the wedge-shaped members 6 and 7 and the grooved rollers 12 and 13 rotating in the direction of the arrows, from which the dry material is delivered to a spraying device 14, 15 rotating in the direction of the arrows. The material passes therefrom in two uniform veils onto the upper cylindrical surfaces of the rollers 16, 17 rotating in the direction of the arrows, said rollers having been previously moistened by means of an adjustable moistening device 18, 19; the meal or grit veils therefore adhere to the water films of the cylindrical surfaces of the said rollers 16, 17 so that the desired preliminary mixing is effected during the passage through the space between the rollers.

The mixture then passes into the conveying channel leading to the press over the scrapers bearing against the lower roller cylindrical surfaces.

Having now particularly described and ascertained the nature of my said invention and in what manner the same is to be performed, I declare that what I claim is:

Preliminary mixer for continuously working paste-preparing apparatus, more particularly for paste presses, the mixer comprising independently regulable delivery means for water and meal or grit, a pair of rollers, scrapers for bearing against the lower portion of the cylindrical surfaces of the rollers, a moistening device applying a film of water to each cylindrical roller surface and a spraying device arranged over the upper periphery of each roller between said moistening device and the gap between the rollers, whereby the dry substance is delivered as a uniform veil to the film of water effecting a preliminary mixing of the mixture ingredients.

GIUSTINO SCIARRA.